United States Patent
Jhamnani et al.

(10) Patent No.: US 7,965,680 B2
(45) Date of Patent: Jun. 21, 2011

(54) METHOD AND SYSTEM FOR UTILIZING COMMONALITY IN DATA STREAMS

(75) Inventors: Alok H. Jhamnani, Chicago, IL (US);
Gary E. Western, Johnsburg, IL (US);
Stephen L. Spear, Skokie, IL (US);
Ronald T. Crocker, St. Charles, IL (US); John M. Harris, Glenview, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 894 days.

(21) Appl. No.: 11/850,115

(22) Filed: Sep. 5, 2007

(65) Prior Publication Data
US 2009/0059832 A1    Mar. 5, 2009

(51) Int. Cl.
*H04W 4/00* (2009.01)
*H04J 3/16* (2006.01)
*G01R 31/08* (2006.01)

(52) U.S. Cl. ...... 370/329; 370/468; 370/238; 455/127.4

(58) Field of Classification Search .................. 370/328, 370/329, 390, 389, 392, 468, 395.21, 395.4, 370/335, 341, 432, 349, 473–475; 455/466, 455/414.1, 59, 60, 61, 70, 72, 127.4
See application file for complete search history.

(56) References Cited

U.S. PATENT DOCUMENTS

| | | | |
|---|---|---|---|
| 7,653,019 B2 * | 1/2010 | Gaast et al. | 370/312 |
| 2007/0082690 A1 | 4/2007 | Fabien et al. | |
| 2007/0133449 A1 * | 6/2007 | Schacht et al. | 370/312 |
| 2007/0177555 A1 * | 8/2007 | Brueck et al. | 370/338 |
| 2008/0031177 A1 * | 2/2008 | Lee et al. | 370/312 |
| 2008/0080474 A1 * | 4/2008 | Kitchin | 370/349 |

* cited by examiner

*Primary Examiner* — Hanh Nguyen
(74) *Attorney, Agent, or Firm* — Steven A. May (57) ABSTRACT

A device (132) for dynamically selecting a wireless communication mode for wirelessly communicating information to at least two wireless communication devices (104, 106) includes a packet data comparator (324) adapted to compare data packets in multiple data streams, each stream designated for transmission to a different one of multiple destination devices and also to identify at least two of the packets having identical information in at least a portion of the packets. The device (132) also includes an output (312) for sending the at least a portion of the packets having the identified identical information to the at least two wireless communication devices in the multicast mode, and also for sending a remainder of the data streams to the at least two wireless communication devices in a unicast mode.

16 Claims, 5 Drawing Sheets

METHOD AND SYSTEM FOR UTILIZING COMMONALITY IN DATA STREAMS

FIELD OF THE INVENTION

The present invention generally relates to the field of wireless communication devices, and more particularly relates to dynamically managing broadcast/multicast and unicast communication modes for wireless communication devices.

BACKGROUND OF THE INVENTION

Wireless communication devices have evolved greatly over the past few years. A wide variety of content such as stock quotes, news, weather, video/audio, and the like can now be provided to a wireless communication device. To provide such diverse content in an efficient manner, two types of wireless information communication modes are available. The first wireless information communication mode is called "unicast." Unicast communication is a point-to-point communication method that sends a copy of the requested information to each of the requesting devices individually. Unicast is useful when not transmitting to large numbers of receiving devices.

The second wireless information communication mode is referred to as "broadcast/multicast" services or BCMCS. The Third Generation Partnership Project 2 or 3GPP2 standards define BCMCS as a service intended to provide a flexible and efficient mechanism to send common (the same) information to multiple users using the most efficient use of air interface and network resources. Retransmission and acknowledgment in BCMCS are not required, since the type of transmission is "one way" and "one to many". Users (wireless communication devices) can subscribe to BCMCS. For example, a BCMCS subscription is normally associated with the program (e.g. CNN, Disney Channel, Sports Channel). However, the type of information transmitted could be any type of data, e.g. text, multimedia (e.g. voice), real-time, and non-real-time streaming media.

Data that needs to be broadcast to multiple users is explicitly denoted as such from the broadcast source. In a great number of instances, unicast data intended for multiple users contains a large amount of commonality, i.e., a significant number of bits/bytes of data are repeated in each individual unicast stream, i.e., in the stream of data for each user and across all users. A great deal of bandwidth is wasted by sending redundant data packets individually to each user via unicast transmission.

Although unicast and broadcasting/multicasting modes are useful methods for transmitting information, a great deal or redundancy exists and an efficient way to optimize these unicast and broadcast/multicast communication modes in a wireless communications system does not exist.

Therefore a need exists to overcome the problems with the prior art as discussed above.

SUMMARY OF THE INVENTION

An apparatus for dynamically selecting a wireless communication mode for wirelessly communicating information to at least two wireless communication devices includes a packet data comparator configured to compare data packets in a plurality of data streams, where each stream is designated for transmission to a different one of a plurality of destination devices. The comparator also identifies at least two of the packets having identical information in at least a portion of the packets. The apparatus sends the at least a portion of the packets having the identified identical information to the at least two wireless communication devices in the multicast mode and then sends a remainder of the data streams to the at least two wireless communication devices in a unicast mode.

A method for dynamically selecting a wireless communication mode for wirelessly communicating information to at least two wireless communication devices includes comparing data packets in a plurality of data streams, where each stream is designated for transmission to a different one of a plurality of destination devices. At least two of the packets having identical information are identified in at least a portion of the packets. Then the at least a portion of the packets having the identified identical information is sent to the at least two wireless communication devices in the multicast mode and a remainder of the data streams are sent to the at least two wireless communication devices in a unicast mode.

Additional advantages of the present invention will be set forth in the Detailed Description which follows and may be obvious from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The presently claimed invention, according to an embodiment, overcomes problems with the prior art by optimizing the wireless communication of information to wireless communication devices by dynamically selecting a wireless information communication mode based at least in part on the amount of "correlation" between data that is to be sent to multiple users. This optimization naturally leads to a significant gain in bandwidth.

The term wireless communication device is intended to broadly cover many different types of devices that can wirelessly receive signals, and optionally can wirelessly transmit signals, and may also operate in a wireless communication system. For example, and not for any limitation, the term wireless communication device can refer to any one or a combination of the following: a cellular telephone, a mobile phone, a smartphone, a two-way radio, a two-way pager, a wireless messaging device, a laptop/computer, automotive gateway, residential gateway, and the like.

Exemplary Wireless Communications System

Figure 1:
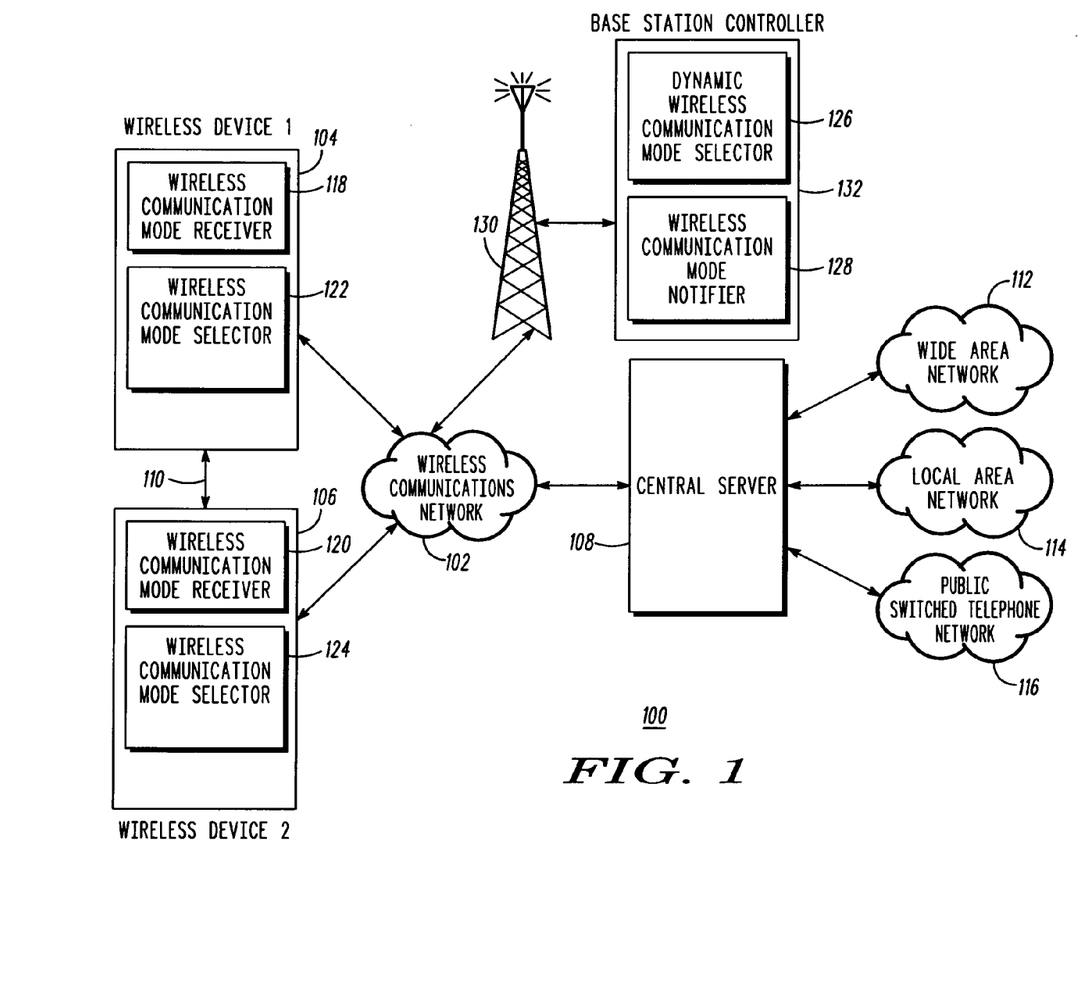
FIG. 1 is a block diagram illustrating an exemplary wireless communications system according to an embodiment of the present invention.

According to an embodiment of the present invention, as shown in FIG. 1, an exemplary wireless communications system 100 is illustrated. FIG. 1 shows a radio access network 102 that connects wireless communication devices, such as wireless communication devices 104 and 106, with a central server 108. The radio access network 102 comprises a mobile phone network, a mobile text messaging device network, a pager network, or the like. Further, the communications standard of the radio access network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like.

Additionally, the radio access network 102 also implements text messaging standards, for example, Short Message Service (SMS), Enhanced Messaging Service (EMS), Multimedia Messaging Service (MMS), or the like. The radio access network 102 also allows for push-to-talk over cellular communications between capable wireless communication devices. In one embodiment the radio access network 102 may be a meshed network.

The radio access network 102 supports any number of wireless communication devices 104, 106. The support of the radio access network 102 includes support for mobile telephones, smart phones, text messaging devices, handheld computers, pagers, beepers, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities. In one embodiment, the radio access network 102 includes one or more transceivers, such as a base transceiver station ("BTS") 130 that comprises a transmitter (not shown) and a receiver (not shown) are able to wirelessly transmit and receive radio signals and that are communicatively coupled to an access network controller, such as a base station controller ("BSC") 132. In various other embodiments of the present invention, a transceiver may be referred to as a Node B or an access point ("AP") and the access network controller as a radio network controller ("RNC").

Additionally, in one embodiment, the wireless communication devices 104, 106 also include an optional local wireless link 110 that allows the wireless communication devices 104, 106 to directly communicate with each other or with other devices without using the radio access network 102. The optional local wireless link 110, for example, is provided by Bluetooth, Infrared Data Access (IrDA) technologies or the like.

Each wireless communication device 104, 106 includes a wireless communication mode receiver 118, 120 and a wireless communication mode selector 122, 124. In one embodiment, the wireless communication mode receiver 118, 120 receives wireless communication mode information from the base transceiver station ("BTS") 130. For example, the BTS 130 transmits a wireless communication mode message to wireless communication devices 104, 106. The message notifies the wireless communication devices 104, 106 to use a specific wireless mode such as an information broadcast mode, a multicast mode, and a unicast mode. The wireless communication mode selector 122, 124 dynamically selects the appropriate wireless communication mode according to the information provided via the BTS 130. In one embodiment, the wireless communication devices 104, 106 are capable of receiving broadcast/multicast services.

In one embodiment, the wireless communication devices 104, 106 send a request for broadcast/multicast ("BCMCS") information to a source providing that information. The wireless communication devices 104, 106 then receive instructions from the BSC 132 regarding the mode that the BCMCS content is to be transmitted by the BTS 130. During reception of the BCMCS content using a particular communication mode, the BSC 132 can instruct the wireless communication devices 104, 106 to switch communication modes. In other words, the mode used to transmit the BCMCS can be changed during the transmission. The wireless communication devices 104, 106, in one embodiment, can further request to continue to receive the BCMCS content when moving to a different coverage area, such as a cell or a sector of a cell. The BSC 132 communicates to the wireless communication devices 104, 106 the transmission mode that the next BTS is using to transmit the BCMCS content.

The BSC 132 includes a dynamic wireless communication mode selector 126 and a wireless communication mode notifier 128. The dynamic wireless communication mode selector 126 dynamically selects a wireless communication mode for wirelessly communicating with the wireless devices 104, 106. For example, based on the number of time-slots needed to transmit requested data, the dynamic wireless communication mode selector 126 dynamically selects a wireless communication mode such as an information broadcasting mode, a multicast mode, or a unicast mode. The unicast mode, in one embodiment, transmits BCMCS traffic by unicast or point-to-point traffic by unicast. The wireless communication mode notifier 128 notifies the wireless devices 104, 106 to use a specific wireless communication mode.

The central server 108 maintains and processes information for all wireless devices such as the wireless communication devices 104, 106 communicating with the RAN 102. Additionally, the central server 108, in this example, communicatively couples the wireless communication devices 104, 106 to a wide area network 112, a local area network 114, and a public switched telephone network 116 through the wireless communications network 102. Each of these networks 112, 114, 116 has the capability of sending data, for example, a multimedia text message to the wireless devices 104, 106.

Exemplary Wireless Communication Device

Figure 2:
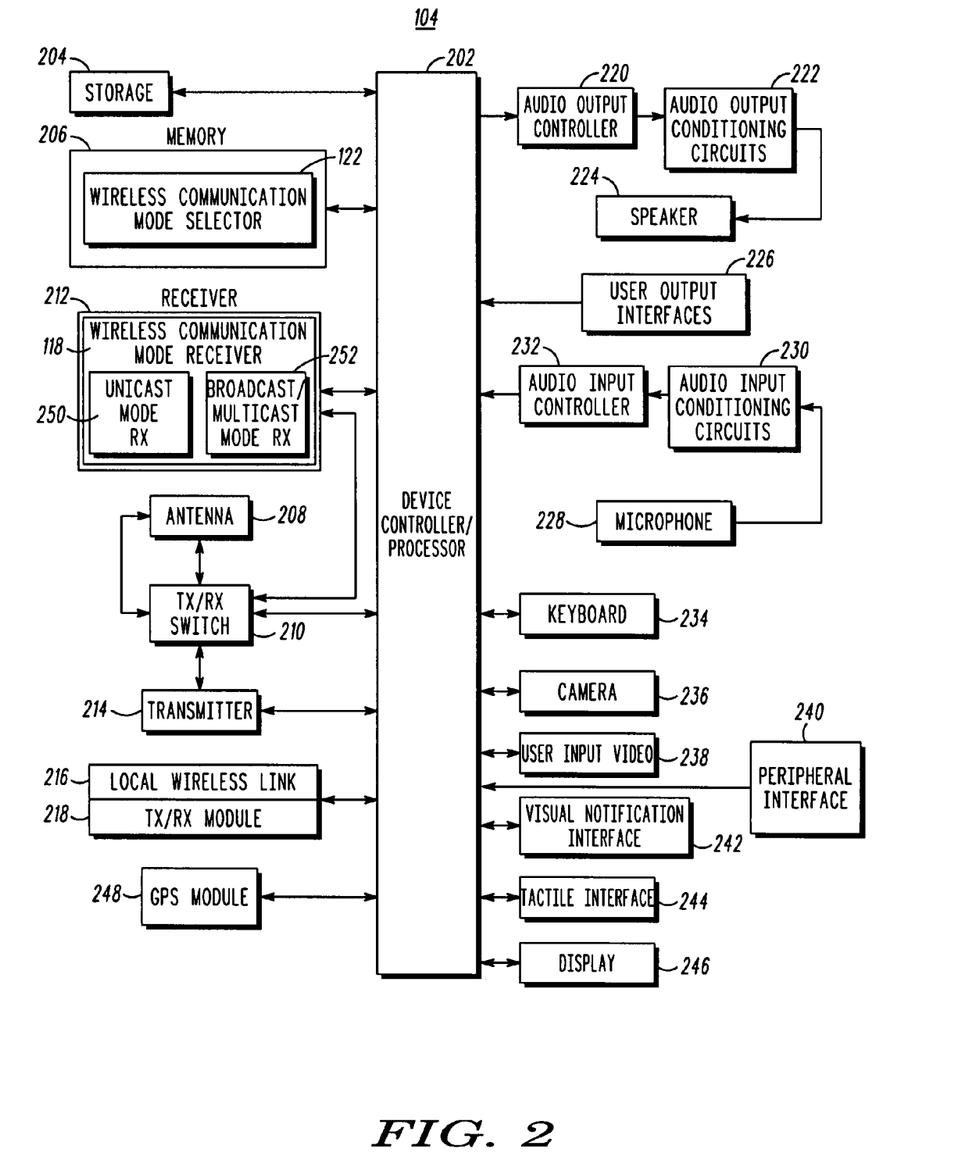
FIG. 2 is a block diagram illustrating an exemplary wireless communication device according to an embodiment of the present invention.

FIG. 2 is a block diagram illustrating a more detailed view of a wireless communication device 200, such as wireless communication devices 104 and 106. The wireless communication device 200 operates under the control of a device controller/processor 202, that controls the sending and receiving of wireless communication signals. In receive mode, the device controller 202 electrically couples an antenna 208 through a transmit/receive switch 210 to a receiver 212. The receiver 212 decodes the received signals and provides those decoded signals to the device controller 202. The receiver 212 also includes the wireless communication mode receiver 118. The wireless communication mode receiver 118, in one embodiment, further includes a unicast communication mode receiver 250 and an information broadcasting/multicast mode receiver 252.

The unicast communication mode receiver 250 receives a notification from the BSC 132 via the BTS 130 to use a unicast communication for wirelessly receiving requested information. As discussed above, the wireless communication devices 104, 106 can receive point-to-point traffic by unicast or BCMCS traffic by unicast. The unicast mode receiver 250 and the broadcast/multicast mode receiver 252 are for processing BCMCS content received by unicast and by broadcast, respectively. The information broadcasting/multicast mode receiver 252 receives a notification from the BSC 132 via the BTS 130 to use an information broadcasting communication mode or multicast mode for wirelessly receiving requested information.

In transmit mode, the device controller 202 electrically couples the antenna 208, through the transmit/receive switch 210, to a transmitter 214. The device controller 202 operates the transmitter and receiver according to instructions stored in the memory 206. These instructions include, for example, a neighbor cell measurement-scheduling algorithm. The memory 206 also includes the wireless communication mode selector 122. The wireless communication mode selector 122 selects, for example, a unicast mode or broadcast mode for receiving BCMCS content based on instructions received from the BSC 132. Although shown residing in memory, the wireless communication mode selector 122, in one embodiment, is implemented as a hardware component. In another embodiment, the transmitter 214 transmits data rate control ("DRC") information to the BSC 130.

The wireless communication device 200 also includes non-volatile storage memory 204 for storing, for example, an application waiting to be executed (not shown) on the wireless communication device 200. The wireless communication device 200, in this example, also includes an optional local wireless link 216 that allows the wireless communication device 200 to directly communicate with another wireless device without using a wireless network (not shown). The optional local wireless link 216, for example, is provided by Bluetooth, Infrared Data Access (IrDA) technologies, or the like. The optional local wireless link 216 also includes a local wireless link transmit/receive module 218 that allows the wireless device 200 to directly communicate with another wireless communication device.

The wireless communication device 200 further includes an audio output controller 220 that receives decoded audio output signals from the receiver 212 or the local wireless link transmit/receive module 218. The audio controller 220 sends the received decoded audio signals to the audio output conditioning circuits 222 that perform various conditioning functions. For example, the audio output conditioning circuits 222 may reduce noise or amplify the signal. A speaker 224 receives the conditioned audio signals and allows audio output for listening by a user. The audio output controller 220, audio output conditioning circuits 222, and the speaker 224 also allow for an audible alert to be generated notifying the user of a missed call, received messages, or the like. The wireless communication device 200 further includes additional user output interfaces 226, for example, a head phone jack (not shown) or a hands-free speaker (not shown).

The wireless communication device 200 also includes a microphone 228 for allowing a user to input audio signals into the wireless communication device. Sound waves are received by the microphone 228 and are converted into an electrical audio signal. Audio input conditioning circuits 230 receive the audio signal and perform various conditioning functions on the audio signal, for example, noise reduction. An audio input controller 232 receives the conditioned audio signal and sends a representation of the audio signal to the device controller 202.

The wireless communication device 200 also comprises a keyboard 234 for allowing a user to enter information into the wireless communication device. The wireless communication device 200 further comprises a camera 236 for allowing a user to capture still images or video images into memory 204. Furthermore, the wireless communication device 200 includes additional user input interfaces 238, for example, touch screen technology (not shown), a joystick (not shown), or a scroll wheel (not shown). In one embodiment, a peripheral interface 240 is included for allowing the connection of a data cable to the wireless communication device 200. In one embodiment of the present invention, the connection of a data cable allows the wireless communication device 200 to be connected to a computer or a printer.

A visual notification (or indication) interface 242 is also included on the wireless communication device 200 for rendering a visual notification (or visual indication), for example, a sequence of colored lights on the display 246 or flashing one or more LEDs (not shown), to the user of the wireless communication device. For example, a received multimedia message may include a sequence of colored lights to be displayed to the user as part of the message. Alternatively, the visual notification interface 242 can be used as an alert by displaying a sequence of colored lights or a single flashing light on the display 246 or LEDs (not shown) when the wireless communication device 200 receives a message, or the user missed a call.

The wireless communication device 200 also includes a tactile interface 244 for delivering a vibrating media component, tactile alert, or the like. For example, a multimedia message received by the wireless communication device 200 may include a video media component that provides a vibration during playback of the multimedia message. The tactile interface 244, in one embodiment, is used during a silent mode of the wireless communication device 200 to alert the user of an incoming call or message, missed call, or the like. The tactile interface 244 allows this vibration to occur, for example, through a vibrating motor or the like.

The wireless communication device 200 also includes a display 246 for displaying information to the user of the wireless communication device and an optional Global Positioning System (GPS) module 248. The optional GPS module 248 determines the location and/or velocity information of the wireless communication device. This module 248 uses the GPS satellite system to determine the location and/or velocity of the wireless communication device. Alternative to the GPS module 248, the wireless communication device 200 may include alternative modules for determining the location and/ or velocity of wireless communication device, for example, using cell tower triangulation and assisted GPS.

Exemplary Information Processing System

Figure 3:
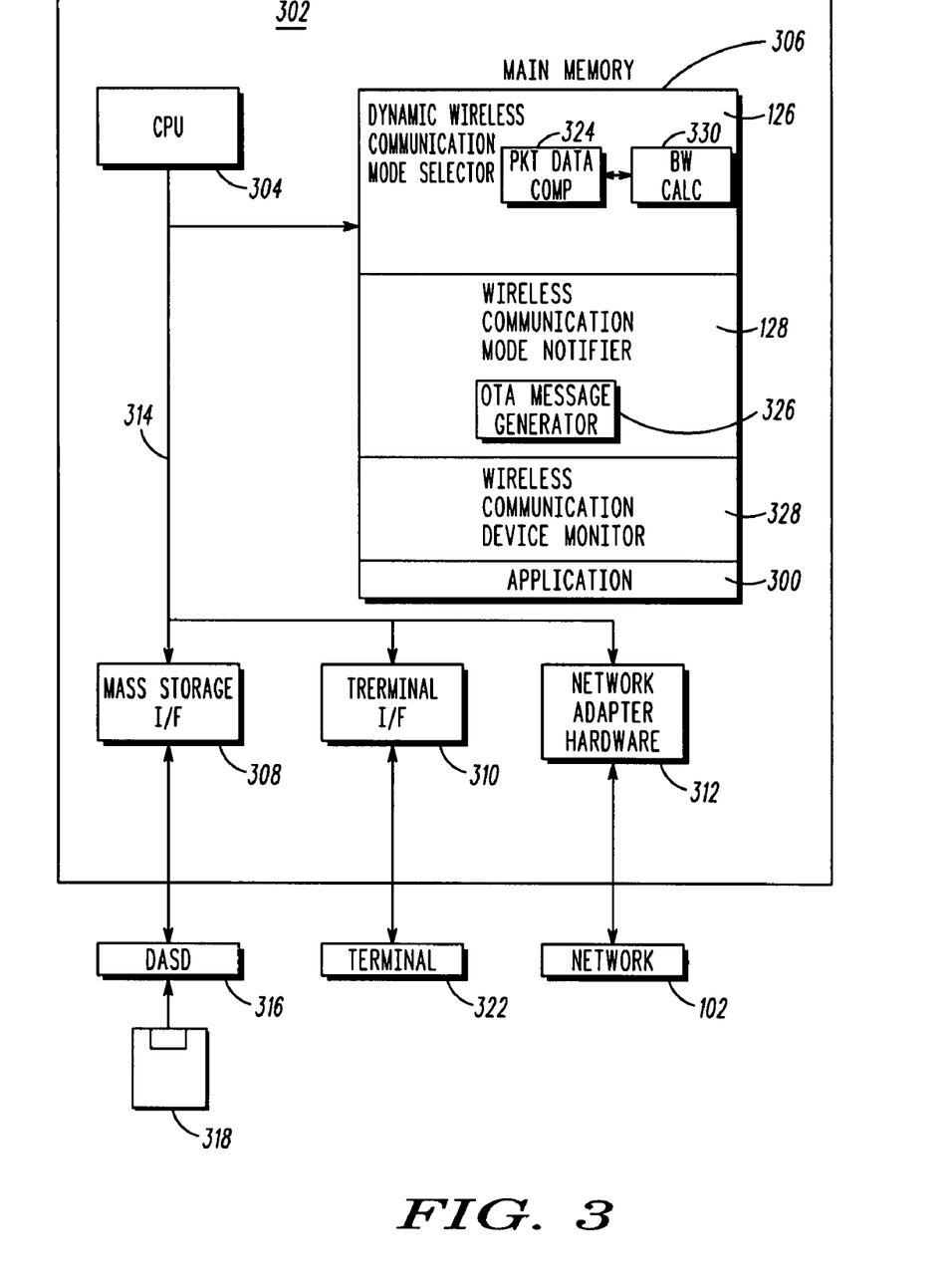
FIG. 3 is a block diagram illustrating an exemplary base station controller including an information processing system according to an embodiment of the present invention.

FIG. 3 is a block diagram illustrating a more detailed view of the BSC 132 according to an embodiment of the present invention. The BSC 132 is based upon a suitably configured processing system adapted to implement an exemplary embodiment of the present invention. Any suitably configured processing system is similarly able to be used as the BSC 132 by embodiments of the present invention. For example, a personal computer, workstation, or the like, may be used. The BSC 132 includes a computer 302. The computer 302 has a processor 304 that is connected to a main memory 306, such as random access memory (RAM), dynamic random access memory (DRAM), and/or read only memory (ROM) or equivalents thereof, mass storage interface 308, terminal interface 310, and network adapter hardware 312. A system bus 314 interconnects these system components. Mass storage interface 308 is used to connect mass storage devices, such as data storage device 316, to the BSC 132. One specific type of data storage device is a computer readable medium such as a floppy disk drive, which may be used to store data to and read data from a floppy diskette 318 or CD/DVD (not shown).

The functionality described herein as being performed by BSC 132 is implemented with or in software programs and instructions stored in the memory 306 of the BSC and executed by the associated processor 304 of the BSC. However, one of ordinary skill in the art realizes that the embodiments of the present invention alternatively may be implemented in hardware, for example, integrated circuits (ICs), application specific integrated circuits (ASICs), and the like, such as ASICs implemented in the BSC. For example, the dynamic wireless communication mode selector 126 can be implemented in hardware, software, or a combination thereof. In one embodiment of the present invention, the main memory 306 includes the dynamic wireless communication mode selector 126, which selector is then implemented by the processor 304. The dynamic wireless communication mode selector 126 dynamically selects a wireless communication mode for transmitting data to requesting wireless communication devices 104, 106.

Multicast Services are services involving the transmission of data destined for more than one destination wireless device as compared to a unicast service where a transmission, and a copy of the data, is individually sent to each destination. The multicast transmission mode is a limited form of broadcast where the content is distributed to a much more limited number of users. One example of a multicast service comprises location-based advertisements. Another example of multicast is when an information channel is only available to a select group of users who have subscribed to the channel.

In one embodiment, the dynamic wireless communication mode selector 126 switches between a broadcast, multicast, or unicast mode based on the amount of common data contained in two or more packets intended for unicast transmission to two or more wireless communication devices. In one embodiment, the dynamic wireless communication mode selector 126 or other designated component sets up unicast traffic channels for BCMCS content when a unicast communication mode is selected.

The dynamic wireless communication mode selector 126 includes a packet data comparator 324 that is capable of comparing two or more data packets to each other, wherein each data packet is associated with a different data stream that is intended for transmission to a different one or multiple wireless communication devices, and determining the existence of common data that is present in the packets, that is, identifying the packets as having identical information in at least a portion of the packets. The probability of finding correlated data is directly proportional to the number of users being considered and the depth into the data buffer of each user being considered. Methods of finding commonality in data are known and beyond the scope of this disclosure. Any of several existing algorithms used by compression mechanisms can be used. The level of granularity to which correlated data is searched for is dependant on the algorithm and can vary from bits to bytes or sets of the same.

The common data found between the two or more packets can, according to an embodiment of the present invention, be abstracted from the packets and sent to the destination wireless communication devices as a single message in the broadcast/multicast mode. However, this process would only be advantageous if the gain in bandwidth outweighs the cost of moving the corresponding users to a common channel for reception of the multicast data. To make this determination, the packet data comparator 324 is coupled to a bandwidth calculator 330, which determines the amount of increase in bandwidth that can be gained by subtracting the common data from each of the unicast packets, moving the receiving devices to a common channel (if necessary), transmitting the common data in the multicast/broadcast mode, moving the receiving devices back to their original channels, and sending the remaining data in unicast mode. Based on the result of the bandwidth calculation performed by the bandwidth calculator 330, which depends upon the amount of common data between packets calculated by the packet data comparator 324, the dynamic wireless communication mode selector 126 can determine whether or not to implement a bandwidth reduction process in accordance with an embodiment of the present invention.

The main memory 306 also includes a wireless communication mode notifier 128. Once the dynamic wireless communication mode selector 126 selects a communication mode, the wireless communication mode notifier 128 notifies requesting devices and/or already subscribed devices of the wireless communication mode to use. The wireless communication mode notifier 128 includes an over-the-air message ("OTA") generator 326. Once the BSC 132 determines that broadcast/multicast mode should be used, it adds broadcast channel information ("BCI") in the OTA for all the requesting and/or subscribing devices. Wireless communication devices 104, 106 that join the broadcast/multicast at a later time detect the program availability and start time through the BCI. In one embodiment, the subscribing wireless devices 104, 106 monitor the OTA and detect and record the BCI in the OTA. The wireless devices 104, 106 then prepare to receive the program by broadcast/multicast. After a pre-configured time interval, which is embedded within the OTA, the wireless devices 104, 106 begin to monitor the broadcast channel. The pre-configured time interval indicates when the broadcast starts.

If unicast is selected as the communication mode, the OTA message generator 326 does not place the BCI in the OTA. The dynamic wireless communication mode selector 126 establishes dedicated channels with the subscribing wireless devices 104, 106 before the broadcast/multicast program starts. Subscribing wireless devices 104, 106 that join later are notified to use unicast communication. If the wireless communication mode is being switched from broadcast/multicast to unicast, the dynamic wireless communication mode selector 126 terminates the broadcast and removes the BCI from the OTA after all subscribing wireless devices 104, 106 have been switched to unicast. The notification that the broadcast flow is now unicast allows the wireless devices 104, 106 to differentiate between a broadcast flow that is unicast and a conventional point-to-point unicast flow that may use different processing or protocols, e.g., Radio Link Protocol.

The main memory 306 also includes a wireless communication device monitor 328. The wireless communication device monitor 328 monitors the wireless devices 104, 106 within the cells controlled by the BSC 132. For example, the wireless communication device monitor 328 can determine when a wireless device 104, 106 is crossing over to a new sector or to a new carrier. The BSC 132, in one embodiment, prepares the wireless device 104, 106 for a communication mode currently being used at the new target location prior to the wireless device 104, 106 completely crossing over into the target location.

For example, if the wireless device 104, 106 is currently receiving requested data using a unicast mode and the new target location is using a broadcast communication mode for the data, the wireless communication mode notifier 128 notifies and prepares the wireless device 104, 106 for the broadcast mode. It should be noted that when a wireless device 104 106 is crossing over into a target coverage area and is in the overlapping area between the target coverage area and the current coverage area, the BSC of either area can notify the wireless device 104, 106 of the communication mode to use.

The memory 306 also includes at least one application 300 that is running or waiting to be executed. Although illustrated as concurrently resident in the main memory 306, it is clear that respective components of the main memory 306 are not required to be completely resident in the main memory 306 at all times or even at the same time. In one embodiment, the BSC 132 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the BSC 132.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 322 to computer 302 to provide a user interface to the BSC 132. These terminals 322, which are able to be non-intelligent or fully programmable workstations, are used to allow system administrators and users to communicate with the BSC 132. The terminal 322 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object-oriented framework mechanism, that allows instructions of the components of operating system (not shown) to be executed on any processor located within the BSC 132.

The network adapter hardware 312 is used to provide an ouput/input or interface to the network 102. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 318, CD ROM, or other form of recordable media, or via any type of electronic transmission mechanism.

Exemplary Wireless Communication System Block Diagram

Figure 4:
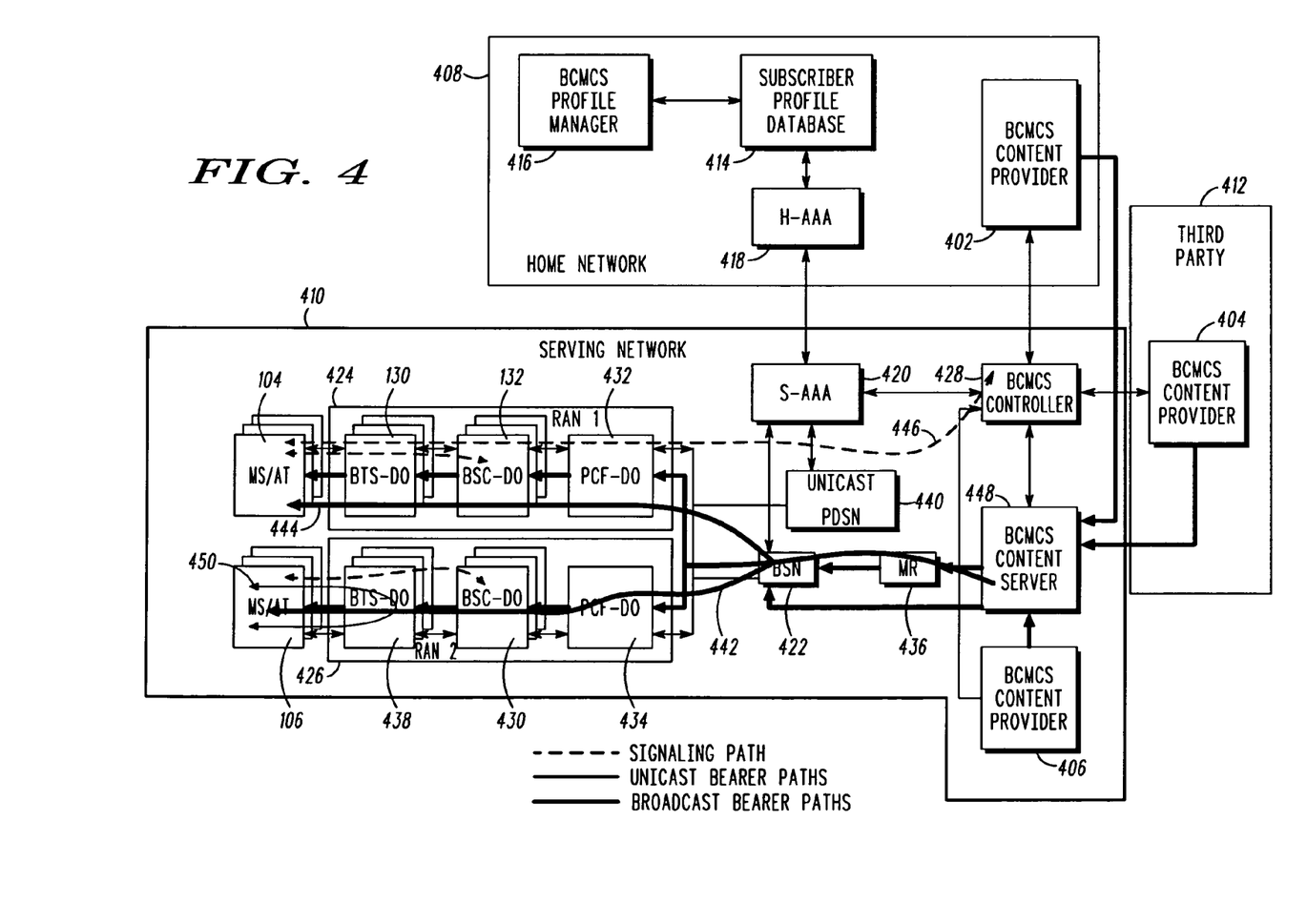
FIG. 4 is a block diagram illustrating a dynamic managing of wireless information communications modes in an exemplary wireless communication system according to an embodiment of the present invention.

FIG. 4 is a block diagram illustrating an exemplary system communication flow for dynamically switching between wireless communication modes according to an embodiment of the present invention. The system communication flow of FIG. 4 is directed towards a 3GPP2 network and is only one example of how the present invention can be implemented. The invention is not limited to a 3GPP2 network and is applicable to other wireless networks as well, as should be obvious to those of ordinary skill in the art in view of the present discussion.

FIG. 4 shows a BCMCS content provider 402, 404, and/or 406 which creates or comprises the content that is to be provided to the wireless communication devices 104, 106. For example, the BCMCS content provider 402, 404, and 406 can reside in a home network 408, such as BCMCS content provider 402, or a serving network 410, such as BCMCS content provider 406, of the wireless communication devices 104, 106. The BCMCS content provider can also reside at a third party location 412, such as BCMCS content provider 404. A subscriber profile database 414 is also included in the home network 408. The subscriber profile database 414 is responsible for storing a BCMCS subscription profile (not shown). The BCMCS subscription profile identifies the BCMCS sessions that a wireless communication device 104, 106 can receive.

The home network 408, in one embodiment also includes a BCMCS subscriber profile manager 416 and home network authentication, authorization and accounting server (H-AAA) 418. The BCMCS subscriber profile manager 416, for example, is an application that updates the BCMCS subscription profile (not shown) in the subscriber profile database 414 regarding the subscribed to broadcast/multicast programs. A wireless communication device 104, 106 can interface to the BCMCS profile manager 416 directly, or an administrator of the BCMCS profile manager 416 may reserve access to the BCMCS profile manager 416 to customer service agents only. The H-AAA 418 and serving network authentication, authorization and accounting (S-AAA) server 420 are responsible for service authentication, authorization, and accounting. The H-AAA 418 accesses the subscriber profile database 414 to obtain information from the subscription profile (not shown). In one embodiment, the S-AAA 420 and BCMCS controller 428 query the H-AAA 418 for the subscription profile (not shown).

The serving network 410 includes the networks 102, 426, BCMCS Content provider 406 and central server 108 (FIG. 1). In one embodiment, the central server consists of both a BCMCS controller 428 and BCMCS Content Server 448. In another embodiment, the BCMCS controller 428 and BCMCS Content Server 448 are separated entities. The BCMCS controller 428 is a core network function that is responsible for managing and providing BCMCS session information. This information is provided to a broadcast serving node 422 ("BSN"), and at least one radio access network ("RAN") 102, 426 (two shown) for the establishment of sessions and bearer paths, optionally via the S-AAA 420. Each of a first RAN, RAN1, 102 and a second RAN, RAN2, 426 of the at least one RAN includes a respective packet control function ("PCF") 432, 434 that is coupled to a respective BSC 132, 430 that dynamically switches the wireless communication devices 104, 106 between broadcast, multicast, and unicast communication modes via the base station controllers, as described above with respect to FIG. 3. Each BSC 132, 430 is further coupled to a respective base transceiver station ("BTS") 130, 438 that is in wireless communication with wireless communication devices, such as wireless communication devices 104, 106, in a coverage area of the BTS.

In one embodiment, the BCMCS controller 428 is communicatively coupled with the wireless communication devices 104, 106 via a packet data serving node ("PDSN"), such as a unicast PDSN 440, to enable the wireless communication devices to obtain program information, register and deregister for service/programs. The BCMCS controller 428 is communicatively coupled with the BCMCS content server 448 to direct the content server on establishment and termination of bearer paths. The BCMCS controller 428 optionally performs authorization using the BCMCS subscriber profile (not shown) residing in the subscriber profile database 414 through the H-AAA 418. The BCMCS controller 428, in one embodiment, also performs discovery operations to assist the wireless communication devices 104, 106 to find desired content such as stock information, weather information, and the like. The BCMCS controller 428, in one embodiment, also authenticates the BCMCS content provider 402, 404, 406, and coordinates the delivery of BCMCS content to the BCMCS content server 448.

Each RAN 102, 426, in one embodiment, via a corresponding BSC 132, 430 maintains a wireless communication device count per flow/sector and a time-slot count for each request of information. For example, a count is maintained for the number of wireless communication devices currently receiving the same wireless information. A flow is a stream of information, such as a CNN video broadcast. The time-slot count is used by the RAN 102, 426, for example, to determine when to dynamically switch a wireless communication mode from unicast to broadcast/multicast or from broadcast/multicast to unicast based at least in part on predefined thresholds.

The BCMCS content server 448 formats the BCMCS content to allow content requested by a wireless communication device 104, 106 to be provided within an IP Multicast stream. The BCMCS content server 448, in one embodiment, includes control logic (not shown) to interface with the BCMCS controller 428 and BCMCS content providers 402, 404, 406 (FIG. 4) and buffers for data payload. In another embodiment, the BCMCS content server 448 also includes media converters/format converters for converting media/format to what is acceptable by the wireless devices 104, 106.

The unicast PDSN 440 communicates with each BSC 132, 430 and each packet control function ("PCF") 432, 434 to add and remove unicast IP flows. The unicast PDSN 440 supports normal point-to-point protocol ("PPP") connections to and from the wireless communication devices 104, 106. The unicast PDSN 440 acts as the first-hop router for IP unicast traffic to and from the wireless communication devices 104, 106. In one embodiment, the BCMCS content is only transmitted via the broadcast bearer path between a BSC 132, 430 and the BCMCS server 448 regardless if the content is to be transmitted using a unicast or broadcast mode over the air. The unicast path for a broadcast mode, in one embodiment, is used between the BSC 132, 430 and the wireless communication devices 104, 106 when a BCMCS program is to be transmitted over the air using unicast channels.

When the BCMCS program is unicast, an identification may be required at the wireless communication devices 104, 106 to differentiate the BCMCS data from regular point-to-point data so BCMCS specific processing can be applied. The point-to-point unicast path, in one embodiment, is implemented as defined by 3GPP2 for wireless communication devices 104, 106 to obtain from the BCMCS controller 428 the BCMCS program information such as program title, schedule, subscription and receiving broadcast access keys ("BAK") for a subscribed program.

Around the starting time of the subscribed BCMCS program, the wireless communication device 104, 106, in one embodiment, begins to send a request to receive the BCMCS content by sending a BCMCS registration message to the BSC 132, 430. The BSC 132, 430 then forwards the BCMCS registration message to the BSN 422, and the BSN 422 then forwards it to the BCMCS controller 428. After the request is authenticated and authorized, the BCMCS controller 428 then sets up the BCMCS bearer path 442, 444 all the way to the BSC 132, 430 or BTS 130, 438.

If a broadcast/unicast switch is placed at the BSC 132, 430 (such as cdma2000 1x), the BSC 132, 430 may terminate the broadcast bearer path 444, 442 and switch the bearer path to a unicast bearer path 450 to transmit the BCMCS program. If the broadcast/unicast switch is placed at the BTS 130, 438 (such as cdma2000 HRPD), the BSC 132, 430 may notify the specific BTS 130, 438 to terminate the broadcast bearer path 444, 442 and switch the bearer path to a unicast radio channels to transmit the BCMCS program. In both cases, the decision is made by the BSC 132, 430. The BSC 132, 430, in one embodiment, provides an identifier in the data packets to the BTS 130, 438 so the BTS 130, 438 can tell if the type of data to be received is point-to-point data, BCMCS data using unicast, or BCMCS data using broadcast. This identifier can be either by a specific port number used as configured or an additional field in the outer header of the data packets. The BSC 132, 430 may add the BCMCS channel information on the BCMCS overhead channel and notify the wireless communication devices 104, 106 if the BCMCS program is to be broadcast or unicast.

In one embodiment, the BSN 422 communicates with the PCF 432, 434 to add and remove multicast and broadcast IP flows. The BSN 422, in one embodiment, uses IP multicast protocols to manage bearer paths 442, 444. A bearer path 442, 444, for example, is a virtual connection which is used to transport the information to the wireless device 104, 106. The term "bearer" refers to the information (such as CNN) that supports multicast IP flows between the BSN 422 and the nearest router connecting back to the BCMCS content server 448. The BSN 422, in one embodiment, applies the flow treatment received from the BCMCS controller 428 to the multicast IP flows.

A multicast router ("MR") 436 is also included in the serving network 410. In an alternative embodiment where the BCMCS content server 448 connects directly to the BSN 422 via Generic Routing Encapsulation ("GRE") tunnels, the MR 436 is not included in the serving network 410. When the BSCs 132, 430 are data optimized BSCs ("BSC-DO") and the PCFs 432, 434 are data optimized PCFs ("PCF-DO"), the BSC-DO and PCF-DO are responsible for signaling, establishing, and tearing down bearer paths between the BSN 422 and the wireless devices 104, 106. The BSC-DO 132, 430 selects the best bearer path to the wireless device 104, 106 based on considerations such as optimization of resources, quality of service ("QoS") requested, and the like. The BSC- DO 132, 430 also establishes BCMCS transmission territories and supports segment based framing.

The PCF-DO 432, 434 connects to multiple PDSNs and BSNs, allowing the PCF to receive BCMCS programs for any BSN capable of transmitting a BCMCS program. Each BTS (data optimized) 130, 438 ("BTS-DO") provides the radio interface to the wireless devices 104, 106. BTSs are "homed" on a BSC-DO 132, 430. In one embodiment, each BTS 130, 438 includes a broadcast/unicast switch for dynamically switching communication modes via a corresponding BSC 132, 430. In another embodiment, the broadcast/unicast switch is placed at the BSC 132, 430 when the broadcast bearer path is switched at the BSC 132, 430.

FIG. 4 shows a unicast communication path 450, a broadcast/multicast communication path 444, and a signaling path 446. The broadcast/multicast communication path 444 travels from the BCMCS content server 448 through the optional MR 436 and the BSN 422 to the wireless communication device 104. The BSN 422 generates an IP multicast flow for the requested broadcast/multicast information. The BSN 422 for broadcast/multicast flows is equivalent to the unicast PDSN 440 for unicast flows. As can be seen, only one bearer path is generated from the BCMCS content server 448 all the way to the BTS-DO 130. This single bearer path supports all of the subscribers in the sector(s) of the BTS 130. In one embodiment, the signaling paths for multicast, broadcast, and unicast as well as the bearer paths for these modes are mostly shared. The RAN 102, 426 is then able to notify the subscribing wireless devices 104, 106 of when to switch communication modes over this single bearer path 444. This is advantageous because network resources such as bandwidth are not wasted by having multiple bearer paths.

The unicast communication path 450 travels from the BTS-DO 130, 438 to the wireless communication device 106. The BTS-DO 130, 438 includes a broadcast/unicast switch that generates the communication path 450. The unicast communication path 450 represents a unicast channel on which information is being wirelessly communicated to the wireless communication device 106 using a unicast communication mode. In one embodiment, a wireless communication unicast communication mode is used, for example, when a threshold has not been reached, e.g., not enough time-slots required. Unicast communication is also used when broadcast/multicast resources are not available. Multiple unicast channels can be established to transmit information to the wireless communication devices 104, 106. As can be seen, the unicast path 450 travels from the BTS-DO 130, 438 to the wireless communication device 106. The path does not start farther back within the network such as from the BCMCS content server 448. This is because the BSC 132 controls the switching of communication modes. This allows for a faster switching between communication modes and more efficient setup of the wireless communication devices 104, 106.

Packet Data Correlation

Figure 5:
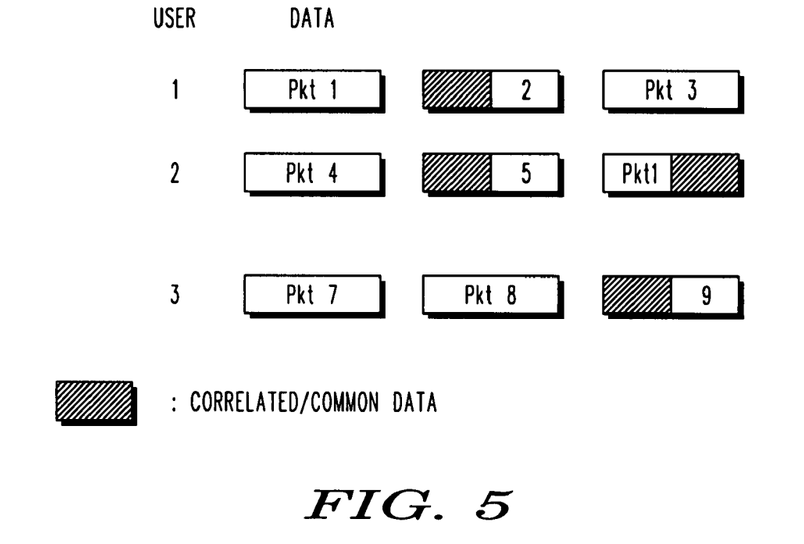
FIG. 5 is a block diagram illustrating data streams suitable for communication to a plurality of users on a plurality of channels according to an embodiment of the present invention.

FIG. 5 illustrates examples of data streams communicated to a plurality of users on a plurality of channels. The data layout shown in FIG. 5 is in the logical link control (LLC) protocol state and includes, for purposes of illustration, three packets for each of three users, that is, users 1, 2, and 3. The shaded portions of packets 2, 5, 6, and 9 indicate commonality, or a correlation, of data. The unshaded portions are unique data to each stream. Of course, a determination of correlation depends on the granularity of the comparison. In other words, all sentences would have a correlation if the granularity was set to a letter level. However, if the sentences are compared at the word level, the correlation factor would significantly drop. It is assumed that a granularity level used in conjunction with the present invention is greater than a character level comparison; however, the level of granularity is up to a designer of the system 100.

The data designated for users 1 and 2, shown in FIG. 5, are to be transmitted on a first channel and the data designated for user 3 is to be transmitted on a second channel. According to one embodiment of the present invention, the common data can be extracted from the four packets 2, 5, 6, and 9, and transmitted to all of the users 1, 2, and 3 simultaneously using a broadcast/multicast mode of transmission. This process is shown in the call flow diagram of FIG. 6.

Further, packets generally consist of addressing information and content information. The addressing information is that information within the packet which is used by a conveyance means, described herein as various elements, for example the BTS-DO 130, BSC-DO 132, and PDSN 440 among others, to transfer a packet from one place to another. The content information is that information within the packet which represents the information to be conveyed between the sender and receiver of the packet.

Multicast Transmission of Correlated Data

Figure 6:
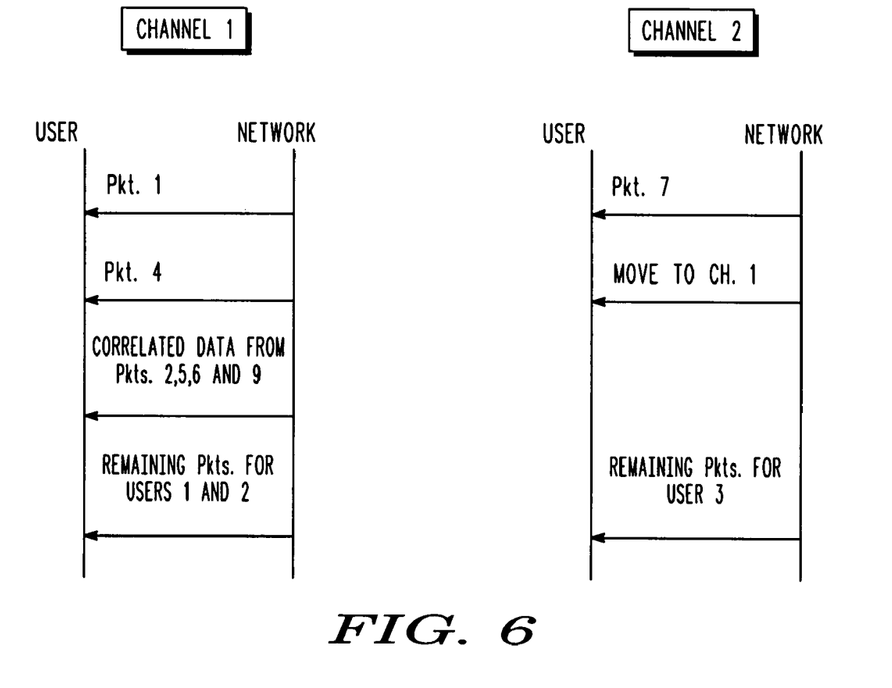
FIG. 6 is a timing and call flow diagram illustrating call flows for using an information broadcasting wireless communication mode and a wireless unicast communication mode according to an embodiment of the present invention.

FIG. 6 is a call flow diagram illustrating a transmission of common data in a multicast mode according to an embodiment of the present invention. A network, such as RAN 102 or 426, first sends, either simultaneously or at different times, packet 1 to user 1 on channel 1, packet 4 to user 2 on channel 1, and packet 7 to user 3 on channel 2. The network then instructs user 3 to move to a common channel, that is, channel 1, for reception of a broadcast/multicast message to users 1, 2, and 3, that is, to the users' corresponding wireless communication devices, such as wireless communication devices 104 and 106, of the correlated data from packets 2, 5, 6, and 9. The network then multicasts, to users 1, 2, and 3, common data from packets 2, 5, 6 and 9, encapsulated in a radio link control protocol. Note that a part of packet 9 is sent to user 3 before packet 8. The radio protocol used should ensure that all packets can be assembled correctly. A protocol example of how to accomplish this is shown below. User 3 then moves back to channel 2 and finally, the remaining packets for users 1 and 2 are transmitted in unicast mode on channel 1 and the remaining packets for user 3 are transmitted in unicast mode on channel 2.

In another embodiment of the present invention, the network may determine a bandwidth gain value for the sending of the at least a portion of the packets having the identified identical information to the users in the multicast mode. The network further determines a cost value for the sending the at least a portion of the packets having the identified identical information to the users in the multicast mode. The network then sends the at least a portion of the packets having the identified identical information to the users in the multicast mode if the bandwidth gain value exceeds the cost value by a predetermined amount. The functions described as being performed by the network with respect to FIGS. 5 and 6 may be performed by the BSC, by the BTS, or may be distributed between the BSC and BTS.

Protocol Example for Transmission of Correlated Data

The following diagram shows an exemplary data structure defining a protocol for multicast of the correlated data amongst users. This data structure may be maintained in the memory 306 of a BSC or the data structure may be maintained in a memory device of a BTS, such as random access memory (RAM), dynamic random access memory (DRAM), and/or read only memory (ROM) or equivalents thereof. The data structure includes a Type/ID data field, a NOFF data field, a CTRL data field, one or more user identifier data fields (e.g., three user identifier data fields—ID1, ID2, and ID3), and one or more user control data fields (e.g., three user control data fields—CTRL1, CTRL2, and CTRL3).

| Type/ID | [NOFF] | CTRL | ID1 | CTRL1 | ... | CTRL2 | ... | Correlated Data | [Additional Data] |
|---|---|---|---|---|---|---|---|---|---|

The Type/ID field indicates whether this data block is broadcast/multicast or intended for a single user (normal transmission). Special broadcast/multicast IDs can be used to indicate the presence of corresponding data.

The NOFF field indicates the number of bits that will be present for indicating the offset into the data stream of the higher-level protocol that is correlated. Those bits are present in the CTRL fields of each user. The presence of NOFF is dependant on a particular implementation of the present invention.

The CTRL field is control information for the entire block (e.g., length indicator, polling bit, etc.) The ID1, ID2, and ID3 fields are Identifiers for the users for which correlated data is present (e.g., a Temporary Flow Identifier in GPRS). The CTRL1, CTRL2 and CTRL3 fields are control information for each user (e.g., Block Sequence Number, polling bit, etc.)

As an example, assume the Radio Link Control/Media Access Control (RLC/MAC) protocol is used under an LLC protocol in a General Packet Radio Services (GPRS) system. RLC/MAC uses a Block Sequence Number (BSN) to identify each unique block. Assume there are 3 users currently sharing a timeslot (ID1, ID2, and ID3). Correlated data is found in the LLCs corresponding to these 3 users. For ID1, it is found at offsets 3 and 5. For ID2, it is found at offset 6 and for ID3, it is found at offset 7, with the offset being calculated as the number of bytes from the current position in the LLC stream which still has to be chopped into RLC blocks.

With respect to the instant example, the maximum offset position at which correlated data is found is 7. Hence 3 bits (111) of offset are sufficient to indicate all offset positions. Therefore, in accordance with one embodiment of the present invention, NOFF is set to 3. CTRL1 will contain the next in sequence BSN for ID1 and, in this example, the offset values of "3" and "5". CTRL2 will contain the next in sequence BSN for ID2 and the offset value of "6". CTRL3 will contain next in sequence BSN for ID3 and the offset value of "7". The advantage of using the next in sequence BSN value is that subsequent BSNs can be formed without any constraints.

In another embodiment of the present invention, NOFF is not included "Pre-chop," which means that "the LLC stream is chopped up to the point including the common data." Usually, only one RLC is chopped from an LLC at a time and transmitted to allow for different decisions about the size of the RLC at each chop event. Generally, more than one RLC is chopped at a time, fixing their size. RLCs for the three users in sequence from the LLC stream, such that the BSN numbers corresponding to the correlated data, is known for each user. These BSNs will not be the next in sequence for the users. In this case, CTRL1 will contain advanced BSN for ID1, one for each offset (3 and 5). CTRL2 will contain the advanced BSN for ID2 for offset 6 and the same will correspondingly follow for ID3 for offset 7. The advantage of this method is that offsets need not be separately included. However, the BSNs that have been pre-chopped cannot be changed after this point and the LLC assembler has to wait for all those BSNs to be received to correctly form the LLC.

In one embodiment, sending multiple IDs can be avoided by assigning a set of users the same ID before the reception of multicast data by means of the existing Radio Control protocol if the associated latency is compensated for. For example, in GPRS, the RLC/MAC protocol allows for a change in the current identifier identified along with a potential change in the current channel. It should be noted that the change in channel/timeslot does not need to be performed every time. In a W-CDMA system, the network would simply assign a universal (same) Identifier (Orthogonal code) to all multicast users, but they would all be listening to the same frequency. It should also be noted that the coding scheme selection should be conservative while sending broadcast/multicast data. Several existing techniques, such as Raptor Codes/Repetition Schemes and others can be employed.

The examplary protocol mentioned above will work as an extension/modification to a unicast protocol, i.e., fairly minor modifications would be needed to existing unicast protocols to account for the various fields needed by the multicast protocol. Hence, the legacy unicast protocol will still work and it can be "extended" with the multicast additions. For example, the "Type/ID" field above designates the ID of the wireless device for which the data packet is intended. This ID is assigned to this wireless device by the network. With the multicast extension added, a special ID, such as "0xFF" can be used as an escape sequence to denote that the packet is actually a multicast packet (much like the 802.3 ethernet protocol). Then the remaining fields of the packet would be decoded accordingly by the devices.

Non-Limiting Examples

The foregoing embodiments of the present invention are advantageous because they provide dynamic optimization of the resources available to wireless communication devices using unicast and broadcast/multicast communication modes. Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for dynamically selecting a wireless communication mode for wirelessly communicating information to at least two wireless communication devices, the method comprising:
   comparing data packets in a plurality of data streams, each stream designated for transmission to a different one of a plurality of destination devices;
   identifying at least two of the packets having identical information in at least a portion of the packets;
   determining a bandwidth gain value for wirelessly sending the at least a portion of the packets having the identified identical information to the at least two wireless communication devices in a multicast mode;
   determining a cost value for the wirelessly sending the at least a portion of the packets having the identified identical information to the at least two wireless communication devices in the multicast mode;

wirelessly sending the at least a portion of the packets having the identified identical information to the at least two wireless communication devices in the multicast mode if the bandwidth gain value exceeds the cost value by a predetermined amount; and wirelessly sending a remainder of the data streams to the at least two wireless communication devices in a unicast mode.

2. The method according to claim 1, further comprising: sending an instruction to the at least two wireless communication devices to receive information in the multicast mode.

3. The method according to claim 2, wherein the instruction is an extension to a wireless unicast protocol.

4. The method according to claim 1, wherein the wirelessly sending the at least a portion of the packets having the identified identical information comprises:

wirelessly transmitting:
the identical information;
a plurality of device identifiers each identifying one of the at least two wireless communication devices that are to receive the identical information; and
an identifier for each of the at least two wireless communication devices that are to receive the identical information, identifying where in a series of data packets the identical information should be organized.

5. The method according to claim 1, further comprising: sending an instruction to at least one of the wireless communication devices to move to a common communication channel.

6. The method according to claim 1, further comprising: assigning to each of the devices, before the wirelessly sending the at least a portion of the packets having the identified identical information to the at least two wireless communication devices in the multicast mode, a universal identifier.

7. The method according to claim 6, wherein the assigning a universal identifier is performed by:
changing a current identifier; and
changing a current channel.

8. The method of claim 1, wherein the identifying at least two of the packets having identical information in at least a portion of the packets comprises comparing a first packet and an at least second packet and determining one or more of:
a first portion of addressing information within the first packet and a second portion of addressing information within the at least second packet are identical; and
a first portion of content within the first packet and a second portion of content within the at least second packet are the same.

9. An apparatus for dynamically selecting a wireless communication mode for wirelessly communicating information to at least two wireless communication devices, the apparatus comprising:
a packet data comparator that compares data packets in a plurality of data streams, each stream designated for transmission to a different one of a plurality of destination devices and identifies at least two of the packets having identical information in at least a portion of the packets;
a bandwidth calculator configured to:
determine a bandwidth gain value for sending the at least a portion of the packets having the identified identical information to the at least two wireless communication devices in a multicast mode; and
determine a cost value for the sending the at least a portion of the packets having the identified identical information to the at least two wireless communication devices in the multicast mode;
means for sending the at least a portion of the packets having the identified identical information to the at least two wireless communication devices in the multicast mode if the bandwidth gain value exceeds the cost value by a predetermined amount; and
means for sending a remainder of the data streams to the at least two wireless communication devices in a unicast mode.

10. The apparatus according to claim 9, further comprising:
a wireless communication mode notifier that sends an instruction to the at least two wireless communication devices to receive information in the multicast mode.

11. The apparatus according to claim 10, wherein the instruction is an extension to a wireless unicast protocol.

12. The apparatus according to claim 9, wherein the means for sending the at least a portion of the packets having the identified identical information and the means for sending a remainder of the data streams is a wireless transmitter.

13. The apparatus according to claim 12, wherein the wireless transmitter transmits:
the identical information;
a plurality of device identifiers each identifying one of the at least two wireless communication devices that are to receive the identical information; and
an identifier for each of the at least two wireless communication devices that are to receive the identical information, identifying where in a series of data packets the identical information should be organized.

14. The apparatus according to claim 9, further comprising a means for sending an instruction to at least one of the wireless communication devices to move to a common communication channel.

15. The apparatus according to claim 9, further comprising:
a processor configured to assign a universal identifier to each of the devices before the means for sending the at least a portion of the packets having the identified identical information to the at least two wireless communication devices sends the at least a portion of the packets having the identified identical information to the at least two wireless communication devices in the multicast mode.

16. The apparatus according to claim 9, wherein the identifying at least two of the packets having identical information in at least a portion of the packets comprises comparing a first packet and an at least second packet and determining one or more of:
a first portion of addressing information within the first packet and a second portion of addressing information within the at least second packet are identical; and
a first portion of content within the first packet and a second portion of content within the at least second packet are the same.

* * * * *